(12) United States Patent
Lee et al.

(10) Patent No.: US 12,211,174 B2
(45) Date of Patent: Jan. 28, 2025

(54) VIDEO DISPLAY SYSTEMS, PORTABLE VIDEO DISPLAY APPARATUSES AND VIDEO ENHANCEMENT METHODS

(71) Applicant: National Yang Ming Chiao Tung University, Hsinchu (TW)

(72) Inventors: Chen-Yi Lee, Hsinchu (TW); Eugene Eu Tzuan Lee, Hsinchu (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 171 days.

(21) Appl. No.: 17/820,118

(22) Filed: Aug. 16, 2022

(65) Prior Publication Data

US 2023/0360175 A1    Nov. 9, 2023

(30) Foreign Application Priority Data

May 5, 2022    (TW) .................................. 111117044

(51) Int. Cl.
*G06T 3/4053*    (2024.01)
*G06F 3/01*    (2006.01)
(Continued)

(52) U.S. Cl.
CPC ............ *G06T 3/4053* (2013.01); *G06F 3/013* (2013.01); *G06T 5/20* (2013.01); *G06T 7/248* (2017.01);
(Continued)

(58) Field of Classification Search
None
See application file for complete search history.

(56) References Cited

U.S. PATENT DOCUMENTS

| 10,380,753 B1 | 8/2019 | Csordás et al. |
| 2004/0125133 A1* | 7/2004 | Pea ........................ H04N 21/84 707/E17.013 |

(Continued)

FOREIGN PATENT DOCUMENTS

| CN | 110942441 A | 3/2020 |
| CN | 112219223 A | 1/2021 |

*Primary Examiner* — Edward Martello
(74) *Attorney, Agent, or Firm* — Christensen, Fonder, Dardi & Herbert PLLC

(57) ABSTRACT

A portable video display apparatus that adopts a L-layer processing architecture and performs the following operations for each layer of $x_1^{th}$ layer to $x_2^{th}$ layer: generating an optical flow map between a first and a second image frames, generating a primary rectified feature map according to a first feature map of the first image frame and the optical flow map, generating an advanced rectified feature map according to the optical flow map, the primary rectified feature map, and a second feature map of the second image frame, and generating a second feature map for the next layer according to the second feature map and the advanced rectified feature map. The portable video display apparatus generates an enlarged image frame by up-sampling the second image frame, generates a display image frame according to the second feature map at the $x_2+1^{th}$ layer and the enlarged image frame and displays it.

20 Claims, 9 Drawing Sheets

(51) Int. Cl.
   *G06T 5/20* (2006.01)
   *G06T 7/246* (2017.01)
   *H04N 19/167* (2014.01)

(52) U.S. Cl.
   CPC ............... *G06T 2207/10016* (2013.01); *G06T 2207/20021* (2013.01); *G06T 2207/20132* (2013.01); *H04N 19/167* (2014.11)

(56) References Cited

U.S. PATENT DOCUMENTS

| | | | |
|---|---|---|---|
| 2018/0139458 A1* | 5/2018 | Wang | G06T 3/4053 |
| 2019/0045168 A1 | 2/2019 | Chaudhuri et al. | |
| 2019/0138889 A1 | 5/2019 | Jiang et al. | |
| 2019/0325595 A1* | 10/2019 | Stein | G06V 10/764 |
| 2021/0004589 A1* | 1/2021 | Turkelson | G06V 30/19173 |
| 2022/0222776 A1* | 7/2022 | Porikli | G06T 7/248 |

* cited by examiner

VIDEO DISPLAY SYSTEMS, PORTABLE VIDEO DISPLAY APPARATUSES AND VIDEO ENHANCEMENT METHODS

PRIORITY

This application claims priority to Taiwan Patent Application No. 111117044 filed on May 5, 2022, which is hereby incorporated by reference in its entirety.

FIELD OF THE INVENTION

The present invention relates to video display systems, portable video display apparatuses, and video enhancement methods. More specifically, the present invention relates to video display systems, portable video display apparatuses, and video enhancement methods that adopt Video Super-Resolution (VSR) techniques.

BACKGROUND OF THE INVENTION

Providing high-resolution video content for watching has become mainstream in the media industry. To display high-resolution video content smoothly at the user end, hardware with sufficient abilities (e.g., sufficient network bandwidth for remote transmission, sufficient computational resources for rendering) is required.

With the multifaceted evolution of the consumer electronics industry, portable electronic devices in various slim and small fashions are available on the market nowadays— smartwatch, for example. In addition, with the growth of applications related to reality technology (e.g., virtual reality, augmented reality, and mixed reality), increasingly portable electronic devices (e.g., smart glasses, head-mounted displays) are provided in head-mounted style. Compared to conventional computer apparatuses (e.g., server, workstation, desktop computer), these portable electronic devices have limited hardware abilities (e.g., limited network bandwidth, limited computational resource). Hence, it is not feasible to adopt conventional technologies to provide high-resolution video content to these kinds of portable electronic devices. As consumers become accustomed to watching high-resolution video content, it is in an urgent need for a technique that delivers high-resolution video content to portable electronic devices with limited hardware abilities.

SUMMARY OF THE INVENTION

An objective of the present invention is to provide a portable video display apparatus. The portable video display apparatus comprises a display apparatus, a transceiving interface, and a processor, wherein the processor is electrically connected to the display apparatus and the transceiving interface. The transceiving interface is configured to receive a first image frame corresponding to a first time point and a second image frame corresponding to a second time point, wherein the second time point is later than the first time point. The processor adopts an image processing architecture having L layers, wherein L is a positive integer greater than one, and different layers correspond to different image resolutions. The processor is configured to perform the following operations for each layer of $x_1^{th}$ layer to $x_2^{th}$ layer in sequence, wherein $x_1 \geq 1$, $x_2 \leq L-1$, and $x_1 \leq x_2$: (a) generating an optical flow map between the first image frame and the second image frame for the layer, (b) generating a primary rectified feature map for the layer according to the optical flow map at the layer and a first feature map of the first image frame at the layer, (c) generating an advanced rectified feature map for the layer according to the optical flow map at the layer, the primary rectified feature map at the layer, and a second feature map of the second image frame at the layer, and (d) generating a second feature map for the next layer according to the second feature map at the layer and the advanced rectified feature map at the layer. The processor is further configured to generate an enlarged image frame by up-sampling the second image frame and generate a display image frame according to the second feature map at the $x_2+1^{th}$ layer and the enlarged image frame. The display apparatus is configured to display the display image frame.

Another objective of the present invention is to provide a video display system, which comprises a host and a portable video display apparatus. The host is configured to generate a first image frame by down-sampling a first original image frame corresponding to a first time point, generate a second image frame by down-sampling a second original image frame corresponding to a second time point, and transmit the first image frame and the second image frame. The portable video display apparatus is configured to receive the first image frame and the second image frame from the host and adopt an image processing architecture having L layers, wherein L is a positive integer greater than one, and different layers correspond to different image resolutions. The portable video display apparatus is configured to perform the following operations for each layer of $x_1^{th}$ layer to $x_2^{th}$ layer in sequence, wherein $x_1 \geq 1$, $x_2 \leq L-1$, and $x_1 \leq x_2$: (a) generating an optical flow map between the first image frame and the second image frame for the layer, (b) generating a primary rectified feature map for the layer according to the optical flow map at the layer and a first feature map of the first image frame at the layer, (c) generating an advanced rectified feature map for the layer according to the optical flow map at the layer, the primary rectified feature map at the layer, and a second feature map of the second image frame at the layer, and (d) generating a second feature map for the next layer according to the second feature map at the layer and the advanced rectified feature map at the layer. The portable video display apparatus is further configured to generate an enlarged image frame by up-sampling the second image frame, generate a display image frame according to the second feature map at the $x_2+1^{th}$ layer and the enlarged image frame, and display the display image frame.

A further objective of the present invention is to provide a video enhancement method adapted for use in an electronic apparatus. The video enhancement method receives a first image frame corresponding to a first time point and a second image frame corresponding to a second time point, wherein the second time point is later than the first time point. The video enhancement method generates an enlarged image frame by up-sampling the second image frame. The video enhancement method executes an image processing architecture having L layers, wherein L is a positive integer greater than one, and different layers correspond to different image resolutions. The video enhancement method performs the following steps for each layer of $x_1^{th}$ layer to $x_2^{th}$ layer in sequence, wherein $x_1 \geq 1$, $x_2 \leq L-1$, and $x_1 \leq x_2$: (a) generating an optical flow map between the first image frame and the second image frame for the layer, (b) generating a primary rectified feature map for the layer according to the optical flow map at the layer and a first feature map of the first image frame at the layer, (c) generating an advanced rectified feature map for the layer according to the optical flow map at the layer, the primary rectified feature map at the layer, and a second feature map of the second image frame at the layer, and (d) generating a second feature map for the next layer according to the second feature map at the layer and the advanced rectified feature map at the layer. The video enhancement method generates a display image frame for an $L^{th}$ layer of the layers according to the second feature map at the $x_2+1^{th}$ layer and the enlarged image frame. The video enhancement method displays the display image frame by a display apparatus.

The video display technology provided by the present invention (at least comprises the portable video display apparatus, the video display system, and the video enhancement method) adopts an image processing architecture having L layers. From the $x_1^{th}$ layer to the $x_2^{th}$ layer, the video display technology provided by the present invention improves the feature maps of the current image frame (i.e., the image frame corresponding to the current time point, such as the previously mentioned second image frame) by the feature maps of the previous image frame (i.e., the image frame corresponding to the previous time point, such as the aforesaid first image frame) in a layer-by-layer fashion. In different embodiments, the video display technology provided by the present invention adopts different ways to generate the feature maps of the previous image frame used at the $x_1^{th}$ layer to the $x_2^{th}$ layer. Furthermore, in some embodiments of the present invention, for each layer of the $x_1^{th}$ layer to the $x_2^{th}$ layer, a clearer Region-Of-Interest (ROI) feature map may be generated according to the coordinate information of an ROI. The ROI feature map is used to partially improve the feature map of the current image frame at the layer. The video display technology provided by the present invention generates an enlarged image frame by up-sampling the current image frame, generates a display image frame by projecting the improved feature map at the last layer (i.e., the $L^{th}$ layer) onto the enlarged image frame, and then display the display image frame. Since the feature map of the current image frame at the last layer has been improved in a layer-by-layer fashion, projecting it onto the enlarged image frame will result in a display image frame that is of high resolution and high quality.

The detailed technology and preferred embodiments implemented for the subject invention are described in the following paragraphs accompanying the appended drawings for a person having ordinary skill in the art to appreciate the features of the claimed invention well.

DETAILED DESCRIPTION

In the following descriptions, the video display systems, portable video display apparatuses, and video enhancement methods of the present invention are explained regarding certain embodiments. However, these embodiments are not intended to limit the present invention to any specific environment, application, or implementation described in these embodiments. Therefore, descriptions of these embodiments illustrate rather than limit the scope of the present invention. It should be noted that, elements unrelated to the present invention are omitted from the depiction in the following embodiments and the attached drawings. Dimensions of and dimensional scales between individual elements in the attached drawings are provided only for ease of depiction and illustration but not to limit the scope of the present invention. Moreover, unless additionally explained, the expressions "a," "the," or the like recited in the specification and the claims should include both the singular and the plural forms.

Figure 1:
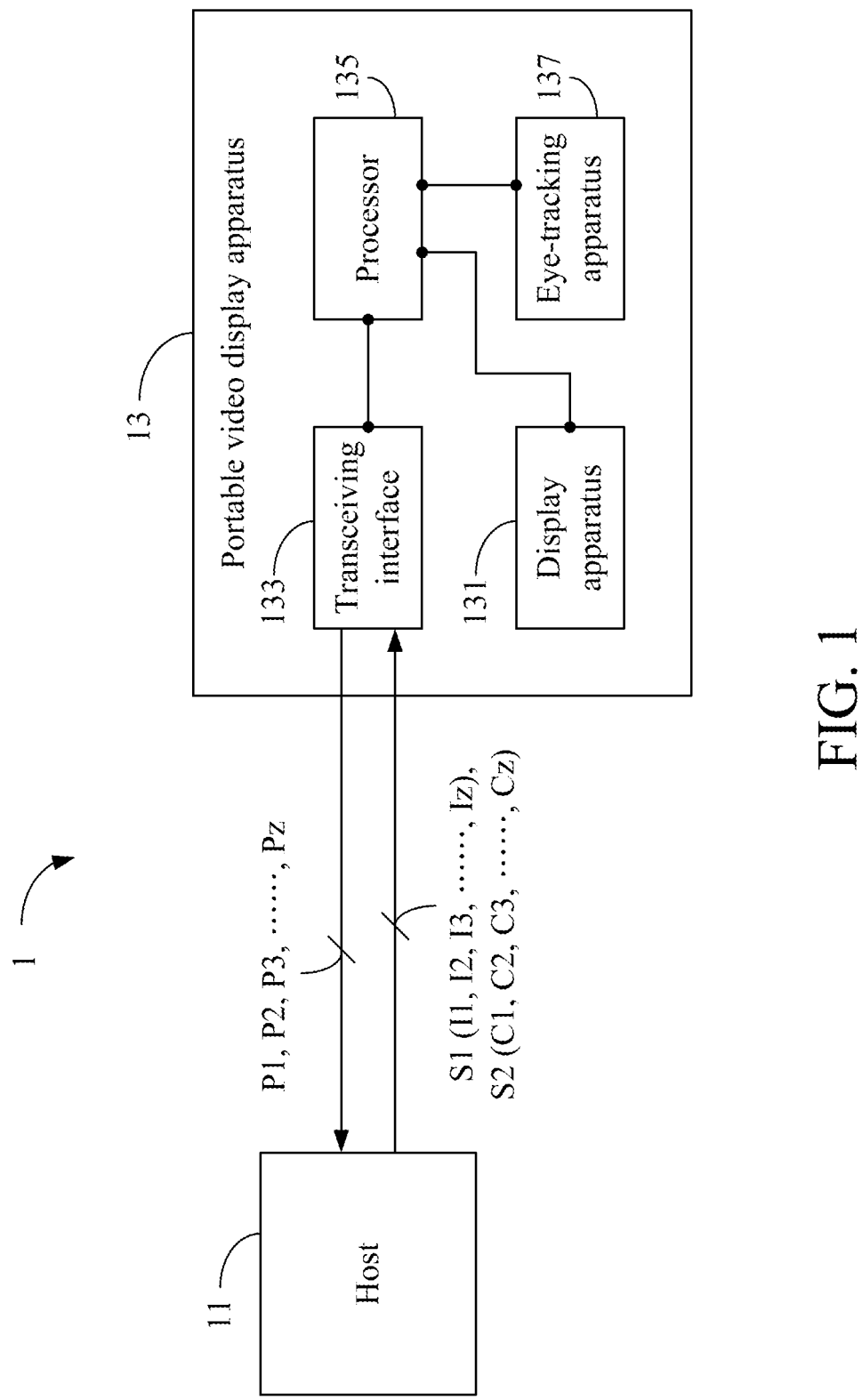
FIG. 1 illustrates a schematic view of a video display system 1 in some embodiments of the present invention.

FIG. 1 illustrates a schematic view of a video display system 1 in some embodiments of the present invention. The video display system 1 comprises a host 11 and a portable video display apparatus 13. The host 11 is an apparatus with computing power and can be installed with one or more operating systems (e.g., Microsoft Windows, iOS, and Android). For example, the host 11 can be a server, a workstation, a desktop, or a notebook. The portable video display apparatus 13 is also an apparatus with computing power. However, compared to the host 11, the portable video display apparatus 13 is an apparatus that is light and easy to carry. For example, the portable video display apparatus 13 may be an intelligent wearable apparatus (e.g., smart glasses).

The portable video display apparatus 13 comprises a display apparatus 131, a transceiving interface 133, and a processor 135, wherein the processor 135 is electrically connected to the display apparatus 131 and the transceiving interface 133. The display apparatus 131 is a display apparatus that is adaptive for a portable electronic apparatus. In some embodiments, the display apparatus 131 may be implemented as a micro display, such as a Digital Light Processing (DLP) display, a Si-Organic Light Emitting Diodes (Si-OLED) display, a Liquid Crystal on Silicon (LCoS) display, and a Micro-Light Emitting Diodes (Micro-LED) display. In some other embodiments, the display apparatus 131 may comprise a projection device that can generate holographic projection and may further comprise a projection material for rendering the holographic projection. The transceiving interface 133 may be a wireless transmission interface, e.g., a Bluetooth interface or a wireless transmission interface known to a person having ordinary skill in the art. The processor 135 may be one of the various processors, central processing units (CPUs), microprocessor units (MPUs), digital signal processors (DSPs), or other computing apparatuses well known to a person having ordinary skill in the art. For example, the processor 135 may be an ARM processor.

The portable video display apparatus 13 may interconnect with the host 11 and serve as another display screen of the host 11 so that the video provided by the host 11 may be rendered on the portable video display apparatus 13 for the user to watch. Please note that the portable video display apparatus 13 is a light and easy-to-carry apparatus whose hardware abilities (e.g., network bandwidth, computational resources) may be quite limited. Therefore, if the host 11 directly transmits a high-resolution video to the portable video display apparatus 13, it is highly possible that the portable video display apparatus 13 cannot receive the high-resolution video fluently and/or render the high-resolution video in time. To avoid the previously mentioned technical problems, the host 11 down-samples a high-resolution video to a low-resolution video and transmits the low-resolution video to the portable video display apparatus 13. The portable video display apparatus 13 processes the received low-resolution video by a video super-resolution technique (i.e., improving the feature maps progressively for each image frame of the video so that each of the display image frames is of high resolution and high quality). The details are described below.

Figure 2:
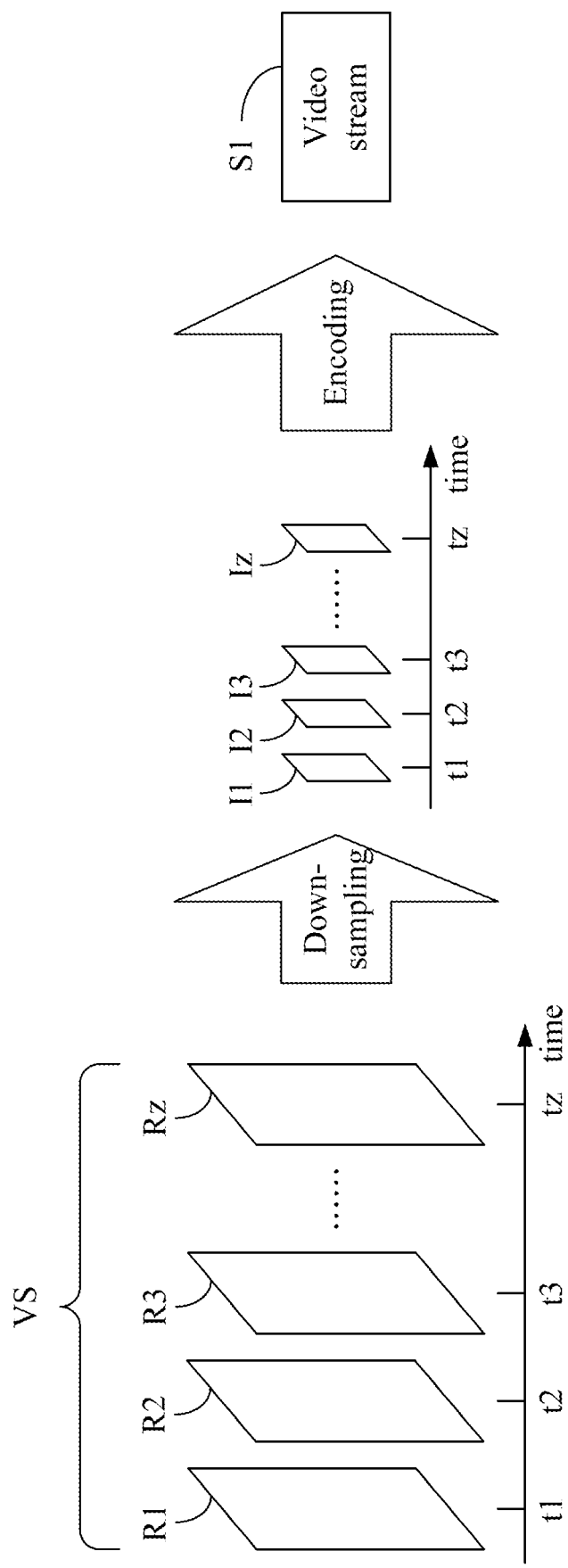
FIG. 2 illustrates the processing for host 11 which applies to a video VS in some embodiments.

FIG. 2 illustrates the processing that the host 11 applies to a video VS in some embodiments. The video VS comprises a plurality of original image frames R1, R2, R3, . . . , Rz, wherein the original image frames R1, R2, R3, . . . , Rz are arranged in sequence according to time and respectively correspond to the time points t1, t2, t3, . . . , tz. The host 11 down-samples the original image frames R1, R2, R3, . . . , Rz individually and therefore low-resolution image frames I1, I2, I3, . . . , Iz corresponding to the time points t1, t2, t3, . . . , tz are generated. In some embodiments, the host 11 transmits the image frames I1, I2, I3, . . . , Iz to the portable video display apparatus 13 directly, while the transceiving interface 133 of the portable video display apparatus 13 receives the image frames I1, I2, I3, . . . , Iz in response. In some embodiments, the host 11 encodes (e.g., compresses) the image frames I1, I2, I3, . . . , Iz into a video stream S1 (e.g., adopting the H.264 encoding technique to encode the image frames I1, I2, I3, . . . , Iz into an H.264 video stream) and then transmits the video stream S1 to the portable video display apparatus 13. In response, the transceiving interface 133 of the portable video display apparatus 13 receives the video stream S1. Then, the processor 135 of the portable video display apparatus 13 decodes (e.g., decompresses) the video stream S1 to derive the image frames I1, I2, I3, . . . , Iz (e.g., adopting the H.264 decoding technique to decompress the H.264 video stream into the image frames I1, I2, I3, . . . , Iz).

Since the image frames I1, I2, I3, . . . , Iz are low-resolution, the portable video display apparatus 13 adopts an image processing architecture having L layers to process the image frames in sequence to improve the resolution and the quality of each image frame, wherein L is a positive integer greater than one. In the image processing architecture, different layers correspond to different image resolutions. If the layers of the image processing architecture are numbered from the first layer to the $L^{th}$ layer, a layer with a greater number will have a higher resolution. In the following descriptions, a current image frame (i.e., the image frame corresponding to the time point t, wherein t is a variable) is used as an example for elaborating how the portable video display apparatus 13 utilizes the L-layer image processing architecture to generate an image frame with high resolution and high quality from a low-resolution image frame.

During the procedure of processing a current image frame by the L-layer image processing architecture, the portable video display apparatus 13 handles each layer of $x_1^{th}$ layer to $x_2^{th}$ layer of the image processing architecture in sequence and then handles the $L^{th}$ layer, wherein $x_1 \geq 1$, $x_2 \leq L-1$, and $x_1 \leq x_2$. For each layer of the $x_1^{th}$ layer to the $x_2^{th}$ layer of the image processing architecture, the processor 135 of the portable video display apparatus 13 performs the following operation (a), operation (b), operation (c), and operation (d) in sequence to improve the feature maps of the current image frame by the feature maps of the previous image frame (i.e., the image frame corresponding to the previous time point t−1) in a layer-by-layer fashion. Please note that if the current image frame is the image frame I1 (i.e., the first one of all the image frames), the previous image frame may be a predetermined image frame (e.g., an image frame whose all pixels are of the same value).

Hereinafter, the operation (a), operation (b), operation (c), and operation (d) performed by the processor 135 for the $l^{th}$ layer are elaborated, wherein the variable l represents any layer from the $x_1^{th}$ layer to the $x_2^{th}$ layer.

Operation (a): The processor 135 generates an optical flow map between the current image frame and the previous image frame for the $l^{th}$ layer. If the $l^{th}$ layer is the first layer, the processor 135 may adopt a method known to a person having ordinary skill in the art (e.g., any kind of optical flow algorithms, a trained deep neural network) to calculate the optical flows between the current image frame and the previous image frame and adopt the calculated optical flows as the optical flow map at the first layer. If the $l^{th}$ layer is not the first layer, the processor 135 up-samples the optical flow map at the previous layer (i.e., the optical flow map at the $(l-1)^{th}$ layer) so that its resolution becomes the same as that of the $l^{th}$ layer and then adopts the up-sampled optical flow map as the optical flow map at the $l^{th}$ layer.

Operation (b): The processor 135 generates a primary rectified feature map for the $l^{th}$ layer according to the optical flow map at the $l^{th}$ layer and a feature map of the previous image frame at the $l^{th}$ layer. The operation (b) can be considered as rectifying the feature map of the previous image frame at the $l^{th}$ layer according to the optical flow map at the $l^{th}$ layer to generate the primary rectified feature map at the $l^{th}$ layer. In some embodiments, the processor 135 may utilize the optical flow map at the $l^{th}$ layer to warp the feature map of the previous image frame at the $l^{th}$ layer to generate the primary rectified feature map at the $l^{th}$ layer, which can be characterized by the following equation (1):

$$\bar{h}_{t-1}^{l} = W(h_{t-1}^{l} | f_{t-1 \to t}^{l}) \tag{1}$$

In the above equation (1), $\bar{h}_{t-1}^{l}$ represents the primary rectified feature map at the $l^{th}$ layer, W represents warping, $h_{t-1}^{l}$ represents the feature map of the previous image frame at the $l^{th}$ layer, and $f_{t-1 \to t}^{l}$ represents the optical flow map at the $l^{th}$ layer. Regarding the feature map of the previous image frame at the $l^{th}$ layer, it may be generated during the procedure that the processor 135 of the portable video display apparatus 13 processes the previous image frame.

Operation (c): The processor 135 generates an advanced rectified feature map for the $l^{th}$ layer according to the optical flow map at the $l^{th}$ layer, the primary rectified feature map at the $l^{th}$ layer, and a feature map of the current image frame at the $l^{th}$ layer. To be more specific, the processor 135 may rectify the feature map of the previous image frame at the $l^{th}$ layer according to the optical flow map at the $l^{th}$ layer, the primary rectified feature map at the $l^{th}$ layer, and the feature map of the current image frame at the $l^{th}$ layer to generate the advanced rectified feature map at the $l^{th}$ layer. If the $l^{th}$ layer is the first layer, the processor 135 may adopt an image feature extraction algorithm known to a person having ordinary skill in the art to extract image features from the current image frame to form the feature map of the current image frame at the first layer. If the $l^{th}$ layer is not the first layer, the processor 135 will generate the feature map of the current image frame at the $l^{th}$ layer when processing the $(l-1)^{th}$ layer regarding the current image frame, which will be elaborated in the subsequent operation (d).

In some embodiments, the processor 135 may adopt a deformable convolution technique to implement the operation (c). The details are described herein. The processor 135 generates an offset for use in a deformable convolution according to the primary rectified feature map at the $l^{th}$ layer, the optical flow map at the $l^{th}$ layer, and the feature map of the current image frame at the $l^{th}$ layer. The processor 135 also generates a mask for use in the deformable convolution according to the primary rectified feature map at the $l^{th}$ layer and the feature map of the current image frame at the $l^{th}$ layer. Then, the processor 135 generates the advanced rectified feature map for the $l^{th}$ layer by performing the deformable convolution on the feature map of the previous image frame at the $l^{th}$ layer according to the offset and the mask. Those mentioned above using a deformable convolution technique to implement the operation (c) may be characterized by the following equation (2), equation (3), and equation (4):

$$o_{t-1 \to t}^{l} = f_{t-1 \to t}^{l} + C_l^o(h_t^l \oplus \bar{h}_{t-1}^l) \quad (2)$$

$$m_{t-1 \to t}^{l} = \sigma(C_l^m(h_t^l \oplus \bar{h}_{t-1}^l)) \quad (3)$$

$$\hat{h}_t^l = \mathcal{D}(h_{t-1}^l | o_{t-1 \to t}^l, m_{t-1 \to t}^l) \quad (4)$$

In the above equation (2), equation (3), and equation (4), $o_{t-1 \to t}^l$ represents the offset for use in the deformable convolution at the $l^{th}$ layer, $f_{t-1 \to t}^l$ represents to optical flow map at the $l^{th}$ layer, $C_l^o$ represents a convolution operation (i.e., a convolution layer) at the $l^{th}$ layer, $h_t^l$ represents the feature map of the current image frame at $l^{th}$ layer, $\bar{h}_{t-1}^l$ represents the primary rectified feature map at the $l^{th}$ layer, $m_{t-1 \to t}^l$ represents the mask for use in the deformable convolution at the $l^{th}$ layer, $C_l^m$ represents a convolution operation (i.e., a convolution layer) at the $l^{th}$ layer, $\hat{h}_t^l$ represents the advanced rectified feature map at the $l^{th}$ layer, $\mathcal{D}$ represents deformable convolution, and $h_{t-1}^l$ represents the feature map of the previous image frame at the $l^{th}$ layer. Moreover, the symbol $\oplus$ represents concatenation in terms of image channel, and the symbol $\sigma$ represents the sigmoid function.

Operation (d): the processor 135 generates a feature map of the current image frame for the next layer (i.e., the $(l+1)^{th}$ layer) according to the feature map of the current image frame at the $l^{th}$ layer and the advanced rectified feature map at the $l^{th}$ layer. In some embodiments, the processor 135 generates an aggregation feature map by aggregating the feature map of the current image frame at the $l^{th}$ layer and the advanced rectified feature map at the $l^{th}$ layer and then generates the feature map of the current image frame for the next layer by up-sampling the aggregation feature map so that its resolution becomes the same as that of the next layer. In those embodiments, the approach mentioned above for generating the feature map of the current image frame for the next layer may be characterized by the following equation (5):

$$h_t^{l+1} = C_l^U(C_l^A(\hat{h}_t^l \oplus h_t^l)) \quad (5)$$

In the above equation (5), $h_t^{l+1}$ represents the feature map of the current image frame at the $(l+1)^{th}$ layer, $C_l^U$ represents the up-sampling operation at the $l^{th}$ layer, $C_l^A$ represents the aggregation operation at the $l^{th}$ layer, $\hat{h}_t^l$ represents the advanced rectified feature map at the $l^{th}$ layer, $h_t^l$ represents the feature map of the current image frame at the $l^{th}$ layer, and the symbol $\oplus$ represents concatenation in terms of the image channel.

For the current image frame, after the processor 135 performs the operation (a), the operation (b), the operation (c), and the operation (d) for each layer of the $x_1^{th}$ layer to the $x_2^{th}$ layer, the feature map generated at the $(x_2+1)^{th}$ layer is of high resolution and high quality. Then, the portable video display apparatus 13 may utilize the feature map of the current image frame generated at the $(x_2+1)^{th}$ layer to generate the display image frame that will be displayed.

At any time point before the processor 135 performs the $L^{th}$ layer of the image processing architecture, the processor 135 may generate an enlarged image frame by up-sampling the current image frame, wherein the resolution of the enlarged image frame is the same as that corresponds to the $L^{th}$ layer. Afterwards, the processor 135 performs the $L^{th}$ layer of the image processing architecture. Specifically, the processor 135 generates a display image frame according to the feature map of the current image frame at the $x_2+1^{th}$ layer and the enlarged image frame. Since the processor 135 utilizes the high-resolution and high-quality feature map generated at the $x_2+1^{th}$ layer to improve the low-resolution enlarged image frame, the generated display image frame will be high-resolution and high-quality. Then, the display apparatus 131 of the portable video display apparatus 13 will display the high-resolution and high-quality display image frame derived by the procedure described above but not the low-resolution current image frame or the low-quality enlarged image frame.

Hereinafter, $x_1$ and $x_2$ described above are elaborated. In different embodiments, the values of $x_1$ and $x_2$ can be set according to the hardware abilities of the portable video display apparatus 13 and/or user preference under the prerequisite that $x_1 \geq 1$, $x_2 \leq L-1$, and $x_1 \leq x_2$.

In some embodiments, the portable video display apparatus 13 has sufficient hardware abilities, and thus $x_1$ and $x_2$ may be respectively set to 1 and L−1 (i.e., $x_1=1$ and $x_2=L-1$) respectively to improve feature maps for L−1 layers. In those embodiments, after the portable video display apparatus 13 performs the operation (a) to the operation (d) of the $(L-1)^{th}$ layer for the current image frame, the feature map of the current image frame at the $L^{th}$ layer will be derived. In those embodiments, the processor 135 of the portable video display apparatus 13 generates the display image frame by projecting the feature map of the current image frame at the $L^{th}$ layer onto the enlarged image frame. For example, the processor 135 may adopt the technique described in "BasicVSR++: Improving Video Super-Resolution with Enhanced Propagation and Alignment" by Kelvin C. K. Chan et al. in 2021 to generate the display image frame by projecting the feature map of the current image frame at the $L^{th}$ layer onto the enlarged image frame. A person having ordinary skill in the art shall know other techniques to project a feature map onto an image frame, and thus the details are not described herein.

Figure 3:
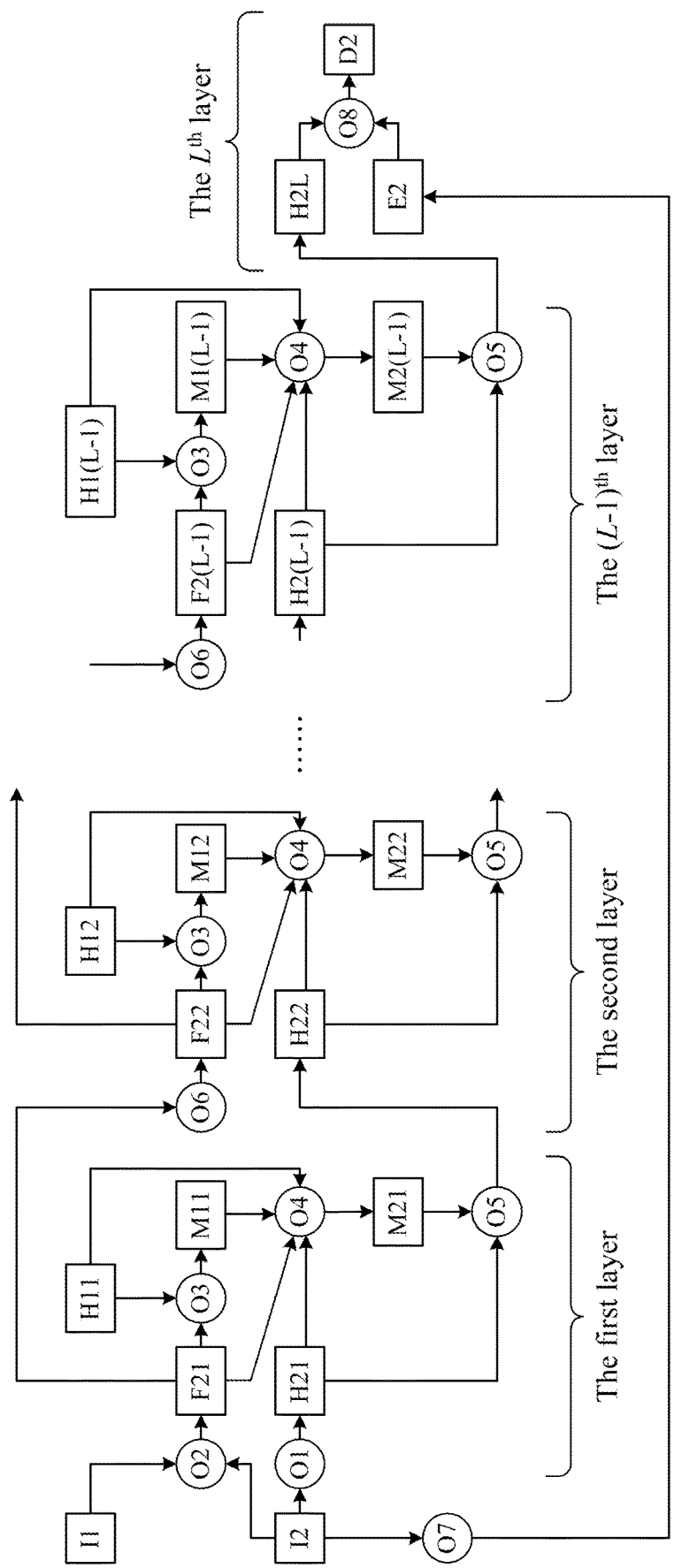
FIG. 3 illustrates a specific example that improves the feature maps for L–1 layers and then generates the display image frame by executing the operations corresponding to the $L^{th}$ layer.

FIG. 3 illustrates a specific example that $x_1=1$ and $x_2=L-1$ (i.e., improving the feature maps for L−1 layers in total and then generating the display image frame by executing the operation corresponding to the $L^{th}$ layer). In this specific example, the image frame I2 is the current image frame, while the image frame I1 is the previous image frame.

At the first layer, the processor 135 executes an image feature extraction algorithm O1 to generate the feature map H21 of the image frame I2 for the first layer. In addition, the processor 135 executes an optical flow algorithm O2 to generate the optical flow map F21 between the image frame I2 and the image frame I1 for the first layer (corresponding to the operation (a) described above). The processor 135 executes the operation O3 to rectify the feature map H11 of the image frame I1 at the first layer by the optical flow map F21 and thereby derive the primary rectified feature map M11 at the first layer (corresponding to the operation (b) described above). The processor 135 executes the operation O4 to rectify the feature map H11 according to the optical flow map F21, the primary rectified feature map M11, and the feature map H21 and thereby derive the advanced rectified feature map M21 at the first layer (corresponding to the operation (c) described above). The processor 135 executes the operation O5 to generate the feature map H22 of the image frame I2 for the second layer (corresponding to the operation (d) described above).

At the second layer, the processor 135 up-samples O6 the optical flow map F21 at the first layer to produce the optical flow map F22 at the second layer (corresponding to the operation (a) described above). The processor 135 executes the operation O3 to rectify the feature map H12 of the image frame I1 at the second layer according to the optical flow map F22 and thereby derive the primary rectified feature map M12 at the second layer (corresponding to the operation (b) described above). The processor 135 executes the operation O4 to rectify the feature map H11 according to the optical flow map F22, the primary rectified feature map M12, and the feature map H22 and thereby derive the advanced rectified feature map M22 at the second layer (corresponding to the operation (c) described above). The processor 135 executes the operation O5 to generate the feature map of the image frame I2 at the third layer according to the feature map H22 and the advanced rectified feature map M22 (corresponding to the operation (d) described above).

The processor 135 adopts the operation logics of the second layer to perform the operations of other layers until the $(L-1)^{th}$ layer. At the $(L-1)^{th}$ layer, the processor 135 up-samples O6 the optical flow map at the previous layer to produce the optical flow map F2(L−1) at the $(L-1)^{th}$ layer (corresponding to the operation (a) described above). The processor 135 executes the operation O3 to rectify the feature map H1(L−1) of the image frame I1 at the $(L-1)^{th}$ layer and thereby derive the primary rectified feature map M1(L−1) at the $(L-1)^{th}$ layer (corresponding to the operation (b) described above). The processor 135 executes the operation O4 to rectify the feature map H1(L−1) according to the optical flow map F2(L−1), the primary rectified feature map M1(L−1), and the feature map H2(L−1) of the image frame I2 at the $(L-1)^{th}$ layer and thereby derive the advanced rectified feature map M2(L−1) at the $(L-1)^{th}$ layer (corresponding to the operation (c) described above). The processor 135 performs the operation O5 to generate the feature map H2L of the image frame I2 at the $L^{th}$ layer according to the feature map H2(L−1) and the advanced rectified feature map M2(L−1) (corresponding to the operation (d) described above).

In addition, the processor 135 generates an enlarged image frame E2 by up-sampling the image frame I2. Afterwards, at the $L^{th}$ layer, the processor 135 performs the operation O8 to project the feature map H2L onto the enlarged image frame E2 thereby deriving the high-resolution and high-quality display image frame D2.

In some embodiments, the portable video display apparatus 13 has limited hardware abilities. Thus, both $x_1$ and $x_2$ may be set to 1 (i.e., $x_1=1$ and $x_2=x_1$) to improve the feature map at the first layer only. In those embodiments, after the portable video display apparatus 13 performs the operation (a) to the operation (d) of the first layer for the current image frame, the feature map of the current image frame at the $(x_2+1)^{th}$ layer (i.e., the second layer) will be derived. In those embodiments, the processor 135 of the portable video display apparatus 13 up-samples the feature map of the current image frame at the $(x_2+1)^{th}$ layer (i.e., the second layer) so that its resolution becomes the same as that of the $L^{th}$ layer and then adopts the up-sampled feature map as the feature map of the current image frame at the $L^{th}$ layer. The processor 135 of the portable video display apparatus 13 then generates the display image frame by projecting the feature map of the current image frame at the $L^{th}$ layer onto the enlarged image frame.

Please refer to FIG. 3 again to consider the portable video display apparatus 13 only executes the operations of the first layer of the image processing architecture (i.e., $x_1=1$ and $x_2=x_1$) to improve the feature map. In that case, after the portable video display apparatus 13 executes the operation (a) to the operation (d) of the first layer and derives the feature map H22 of the image frame I2 at the second layer, the portable video display apparatus 13 will generate the feature map H2L at the $L^{th}$ layer by up-sampling the feature map H22 and then generate the display image frame D2 by projecting the feature map H2L onto the enlarged image frame E2.

In some embodiments, the $x_1$ and $x_2$ described above may be set to other values as long as $x_1 \geq 1$, $x_2 \leq L-1$, and $x_1 \geq x_2$. Please note that if $x_1$ is not equal to 1, the processor 135 will generate the feature map of the current image frame at the first layer and the optical flow map at the first layer, up-sample them so that their resolutions are the same as that of the $x_1^{th}$ layer, and then perform the operations for each layer of the $x_1^{th}$ layer to the $x_2^{th}$ layer. Furthermore, if $x_2$ is not equal to $L-1$, the processor 135, after executing the operations for the $x_2^{th}$ layer, will up-sample the feature map of the current image frame at the $(x_2+1)^{th}$ layer so that its resolution is the same as that of the $L^{th}$ layer and then use the up-sampled feature map as the feature map of the current image frame at the $L^{th}$ layer. Then, the processor 135 of the portable video display apparatus 13 generates the display image frame by projecting the feature map of the current image frame at the $L^{th}$ layer onto the enlarged image frame. According to the descriptions mentioned above, a person having ordinary skill in the art shall understand the operations performed by the processor 135 when $x_1$ and $x_2$ are other values, and thus the details are not described herein.

In some embodiments, to improve the feature maps of the current image frame layer by layer more accurately, the processor 135 of the portable video display apparatus 13 may utilize the feature map of the previous image frame at the $L^{th}$ layer when executing the operations of each layer of the $x_1^{th}$ layer to the $x_2^{th}$ layer. To be more specific, the processor 135 generates the feature map of the previous image frame for each layer of the $x_1^{th}$ layer to the $x_2^{th}$ layer by down-sampling the feature map of the previous image frame at the $L^{th}$ layer for at least one time (i.e., down-sampling the feature map of the previous image frame at the $L^{th}$ layer for at least one time so that the resolutions are the same as those of the $x_1^{th}$ layer to the $x_2^{th}$ layer). Please note that the feature map of the previous image frame at the $L^{th}$ layer is high-resolution and high-quality because the processor 135 has improved the resolution and the quality of the feature maps of the previous image frame when processing the previous image frame. As a result, when processing the current image frame, the feature maps of the previous image frame for the $x_1^{th}$ layer to the $x_2^{th}$ layer derived by down-sampling the feature map of the previous image frame at the $L^{th}$ layer will have better quality. They thus can improve the feature map of the current image frame layer by layer more accurately.

Similarly, in those embodiments, during the procedure of processing a current image frame by the L-layer image processing architecture, the portable video display apparatus 13 handles each layer of the $x_1^{th}$ layer to the $x_2^{th}$ layer of the image processing architecture in sequence and then handles the $L^{th}$ layer, wherein $x_1 \geq 1$, $x_2 \leq L-1$, and $x_1 \leq x_2$. For each layer of the $x_1^{th}$ layer to the $x_2^{th}$ layer of the image processing architecture, the processor 135 of the portable video display apparatus 13 performs the operation (a), operation (b), operation (c), and operation (d) in sequence. Regarding the operation (a), operation (b), operation (c), and operation (d) for each layer (expressed as the $l^{th}$ layer in the following descriptions) of the $x_1^{th}$ layer to the $x_2^{th}$ layer performed herein, only the portions different to the embodiments mentioned above are elaborated on.

Operation (a): The processor 135 generates an optical flow map between the current image frame and the previous image frame for the $l^{th}$ layer.

Operation (b): The processor 135 down-samples the feature map of the previous image frame at the $L^{th}$ layer so that its resolution is the same as that of the $l^{th}$ layer and adopts the down-sampled feature map as the feature map of the previous image frame at the $l^{th}$ layer. Then, the processor 135 generates a primary rectified feature map for the $l^{th}$ layer according to the optical flow map at the $l^{th}$ layer and the feature map of the previous image frame at the $l^{th}$ layer. The operation (b) can be considered as rectifying the feature map of the previous image frame at the $l^{th}$ layer according to the optical flow map at the $l^{th}$ layer to generate the primary rectified feature map at the $l^{th}$ layer. In some embodiments, the processor 135 may utilize the optical flow map at the $l^{th}$ layer to warp the feature map of the previous image frame at the $l^{th}$ layer to generate the primary rectified feature map at the $l^{th}$ layer, which can be characterized by the following equation (6):

$$\tilde{h}_{t-1}^l = W(S_\downarrow^l(h_{t-1}^L)|f_{t-1 \to t}^l) \quad (6)$$

In the above equation (6), $\tilde{h}_{t-1}^l$ represents the primary rectified feature map at the $l^{th}$ layer, W represents warping, $S_\downarrow^l$ represents down-sampling something to the resolution identical to that of the $l^{th}$ layer, $h_{t-1}^L$ represents the feature map of the previous image frame at the $L^{th}$ layer, and $f_{t-1 \to t}^l$ represents the optical flow map at the $l^{th}$ layer.

Operation (c): The processor 135 generates an advanced rectified feature map for the $l^{th}$ layer according to the optical flow map at the $l^{th}$ layer, the primary rectified feature map at the $l^{th}$ layer, and a feature map of the current image frame at the $l^{th}$ layer. To be more specific, the processor 135 may rectify a map that is related to the feature map of the previous image frame at the $l^{th}$ layer according to the optical flow map at the $l^{th}$ layer, the primary rectified feature map at the $l^{th}$ layer, and the feature map of the current image frame at the $l^{th}$ layer to generate the advanced rectified feature map at the $l^{th}$ layer. For example, $S_\downarrow^l(h_{t-1}^L)$ in the above equation (6) represents the feature map of the previous frame at the $l^{th}$ layer, and $\tilde{h}_{t-1}^l$ derived by rectifying $S_\downarrow^l(h_{t-1}^L)$ according to the equation (6) may be the objective to be rectified in the operation (c). In some embodiments, the processor 135 may use a deformable convolution technique to implement the operation (c), which may be characterized by the following equation (7), equation (8), and equation (9):

$$o_{t-1 \to t}^l = f_{t-1 \to t}^l + C_l^O(h_t^l \oplus \tilde{h}_{t-1}^l) \quad (7)$$

$$m_{t-1 \to t}^l = \sigma(C_l^m(h_t^l \oplus \tilde{h}_{t-1}^l)) \quad (8)$$

$$\hat{h}_t^l = \mathcal{D}(\tilde{h}_{t-1}^l|o_{t-1 \to t}^l, m_{t-1 \to t}^l) \quad (9)$$

In the above equation (7), equation (8), and equation (9), $o_{t-1 \to t}^l$ represents the offset for use in the deformable convolution at the $l^{th}$ layer, $f_{t-1 \to t}^l$ represents the optical flow map at the $l^{th}$ layer, $C_l^O$ represents a convolution operation (i.e., a convolution layer) at the $l^{th}$ layer, $h_t^l$ represents the feature map of the current image frame at the $l^{th}$ layer, $\tilde{h}_{t-1}^l$ represents the primary rectified feature map at the $l^{th}$ layer, $m_{t-1 \to t}^l$ represents the mask for use in the deformable convolution at the $l^{th}$ layer, $C_l^m$ represents another convolution operation (i.e., a convolution layer) at the $l^{th}$ layer, $\hat{h}_t^l$ represents the advanced rectified feature map at the $l^{th}$ layer, and $\mathcal{D}$ represents the deformable convolution. Furthermore, the symbol $\oplus$ represents concatenation in terms of image channel, and the symbol $\sigma$ represents the sigmoid function.

Operation (d): the processor 135 generates a feature map of the current image frame for the next layer (i.e., the $(l+1)^{th}$ layer) according to the feature map of the current image frame at the $l^{th}$ layer and the advanced rectified feature map at the $l^{th}$ layer.

Similarly, after the portable video display apparatus 13 performs the operation (a), the operation (b), the operation (c), and the operation (d) for each layer of the $x_1^{th}$ layer to the $x_2^{th}$ layer for the current image frame, the portable video display apparatus 13 may use the feature map of the current image frame at the $(x_2+1)^{th}$ layer to generate the display image frame that will be displayed. The details are not repeated.

Similarly, the values of $x_1$ and $x_2$ can be set according to the hardware abilities of the portable video display apparatus 13 and/or user preference as long as the requirements that $x_1 \geq 1$, $x_2 \leq L-1$, and $x_1 \leq x_2$ are satisfied.

Figure 4:
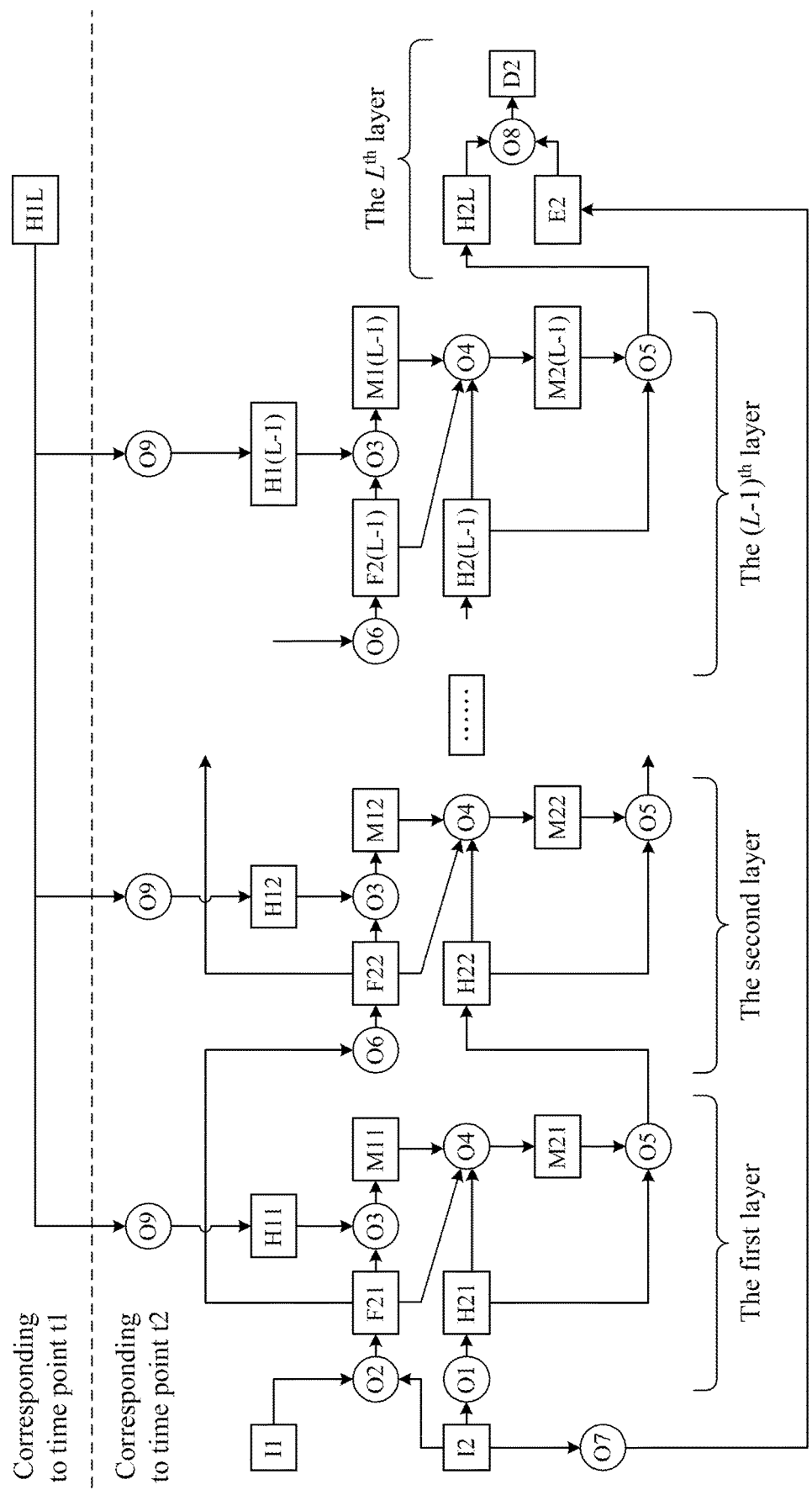
FIG. 4 illustrates another specific example that improves the feature maps for L–1 layers and then generates the display image frame by executing the operations corresponding to the $L^{th}$ layer.

FIG. 4 illustrates a specific example that $x_1=1$ and $x_2=L-1$ (i.e., improving the feature maps for L-1 layers and then generating the display image frame by executing the operation corresponding to the $L^{th}$ layer). The specific example shown in FIG. 4 is similar to that in FIG. 3; however, the specific example shown in FIG. 4 utilizes the feature map of the previous image frame at the $L^{th}$ layer to generate the feature map of the previous image frame at each layer of the $x_1^{th}$ layer to the $x_2^{th}$ layer when processing the current image frame. As shown in FIG. 4, during the procedure of handling the image frame I2 corresponding to the time point t2, the portable video display apparatus 13 down-samples O9 the feature map H1L at the $L^{th}$ layer, derived when processing the image frame I1, to generate the feature maps H11, . . . , H1(L-1) at the first layer to the $(L-1)^{th}$ layer respectively.

Since the portable video display apparatus 13 has improved the resolution and the quality of the feature maps of the image frame I1 layer by layer when processing the image frame I1, the feature map H1L at the $L^{th}$ layer is high-resolution and high-quality. Therefore, when the portable video display apparatus 13 processes the image frame I2, the feature maps H11, . . . , H1(L-1) at the first layer to the $(L-1)^{th}$ layer derived by down-sampling the feature map H1L of the image frame I1 at the $L^{th}$ layer will have better quality. Thus, the feature maps H21, . . . , H2(L-1) of the image frame I2 at the first layer to the $(L-1)^{th}$ can be improved more accurately. As a result, the display image frame D2 will be high-resolution and have better quality.

In some embodiments, to improve the feature maps of the current image frame layer by layer more accurately, the video display system 1 may adopt the Foveated Video Super-Resolution (FVSR) technique. The video display system 1 will partially improve each feature map of the current image frame in a layer-by-layer fashion according to coordinate information of at least one Region of Interest (ROI).

In some embodiments, the video display system 1 predetermines an ROI and its coordinate information, and both the host 11 and the portable video display apparatus 13 know the coordinate information of the ROI.

In some embodiments, the portable video display apparatus 13 dynamically determines the coordinate information of an ROI (e.g., the coordinate information P1, P2, P3, . . . , Pz corresponding to the time points t1, t2, t3, . . . , tz) and transmits them to the host 11. In those embodiments, the portable video display apparatus 13 further comprises an eye-tracking apparatus 137 electrically connected to the processor 135. For each time points to be processed, the eye-tracking apparatus 137 tracks a plurality of gaze points (not shown) of a user on the display apparatus 131, the processor 135 determines the coordinate information of an ROI (not shown) on the display apparatus according to the gaze points, and the transceiving interface 133 transmits the coordinate information to the host 11.

Figure 5:
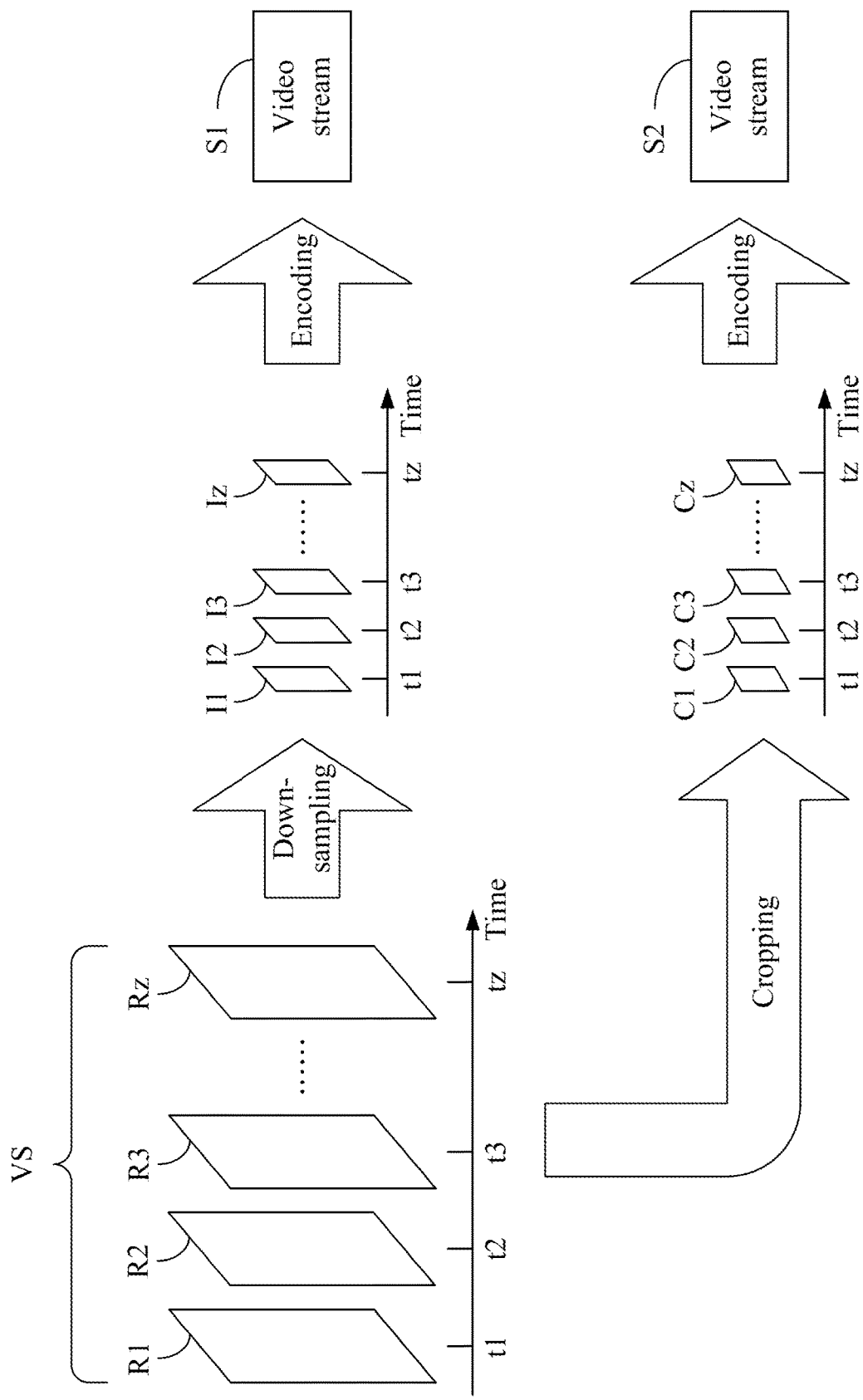
FIG. 5 illustrates the process that the host 11 performs on a video stream VS in the embodiments that adopt the foveated video super-resolution technique.

FIG. 5 illustrates the process that the host 11 performs on the video stream VS in those embodiments. Comparing FIG. 5 with FIG. 2 shows that the host 11 in those embodiments further crops the original image frame R1, R2, R3, . . . , Rz to the ROI image frame C1, C2, C3, . . . , Cz respectively according to coordination information of an ROI region. In some embodiments, the host 11 directly transmits the ROI image frame C1, C2, C3, . . . , Cz to the portable video display apparatus 13, and the transceiving interface 133 receives the ROI image frame C1, C2, C3, . . . , Cz in response. In some embodiments, the host 11 encodes (e.g., compresses) the ROI image frame C1, C2, C3, . . . , Cz into a video stream S2 (e.g., adopting the H.264 encoding technique to encode the ROI image frame C1, C2, C3, . . . , Cz into an H.264 video stream) and then transmits the video stream S2 to the portable video display apparatus 13, and the transceiving interface 133 of the portable video display apparatus 13 decodes (e.g., decompresses) the video stream S2 to derive the ROI image frame C1, C2, C3, . . . , Cz (e.g., adopting the H.264 decoding technique to decompress the H.264 video stream into the ROI image frame C1, C2, C3, . . . , Cz) in response.

Similarly, in those embodiments, during the procedure of processing a current image frame by the L-layer image processing architecture, the portable video display apparatus 13 handles each layer of the $x_1^{th}$ layer to the $x_2^{th}$ layer of the image processing architecture in sequence and then handles the $L^{th}$ layer, wherein $x_1 \geq 1$, $x_2 \leq L-1$, and $x_1 \leq x_2$. For each layer of the $x_1^{th}$ layer to the $x_2^{th}$ layer of the image processing architecture, the processor 135 of the portable video display apparatus 13 performs the operation (a), operation (b), operation (c), and operation (d) in sequence. In addition, for each layer of the $x_1^{th}$ layer to the $x_2^{th}$ layer, the processor 135 generates an ROI feature map for use in the operation (d) to further enhance the feature map in part.

To be more specific, to process the current image frame, the transceiving interface 133 receives a first ROI image frame that corresponds to both the time point of the current image frame and an ROI (i.e., the image frame derived by cropping the original image frame that corresponds to the current image frame according to the ROI) from the host 11. Furthermore, the processor 135 generates a second ROI image frame according to coordinate information of the ROI and the current image frame. For example, the processor 135 may generate the second ROI image frame by cropping the current image frame to a sub-image frame according to the coordinate information of the ROI and generate the second ROI image frame by up-sampling the sub-image frame. Please note that the multiple of the resolution of the $L^{th}$ layer to the resolution of the first layer is the multiple that the processor 135 up-samples the sub-image frame. Then, the processor 135 generates an ROI feature map for the $L^{th}$ layer according to the first ROI image frame and the second ROI image frame. For example, the processor 135 may generate a superimposition image frame by superimposing the first ROI image frame and the second ROI image frame and then perform feature extraction on the superimposition image frame to derive the ROI feature map at the $L^{th}$ layer.

Next, the processor 135 generates an ROI feature map for each layer of the $x_1^{th}$ layer to the $x_2^{th}$ layer by down-sampling the ROI feature map at the $L^{th}$ layer at least once. If the layers are denoted as the $l^{th}$ layer, and the multiple of the resolution of the $l^{th}$ layer to the resolution of the $L^{th}$ layer is the multiple that the processor 135 down-samples the ROI feature map. Then, for each layer of the $x_1^{th}$ layer to the $x_2^{th}$ layer, the processor 135 may generate the feature map of the current image frame for the next layer according to the feature map of the current image frame at the layer, the advanced rectified feature map at the layer, and the ROI feature map at the layer. In those embodiments, the way to generate the feature map of the current image frame for the next layer may be characterized by the following equation (10):

$$h_t^{l+1} = C_l^U(C_l^{CRA}(C_l^A(\hat{h}_t^l \oplus h_t^l) \oplus h_t^{Fov,l})) \qquad (10)$$

In the above equation (10), $h_t^{l+1}$ represents the feature map of the current image frame at the $(l+1)^{th}$ layer, $C_l^U$ represents the up-sampling operation at the $l^{th}$ layer, $C_l^{CRA}$ represents a convolution operation at the $l^{th}$ layer, $C_l^A$ represents an aggregation operation at the $l^{th}$ layer, $\hat{h}_t^l$ represents the advanced rectified feature map at the $l^{th}$ layer, $h_t^l$ represents the feature map of the current image frame at the $l^{th}$ layer, and $h_t^{Fov,l}$ represents the ROI feature map at the $l^{th}$ layer.

Figure 6A:
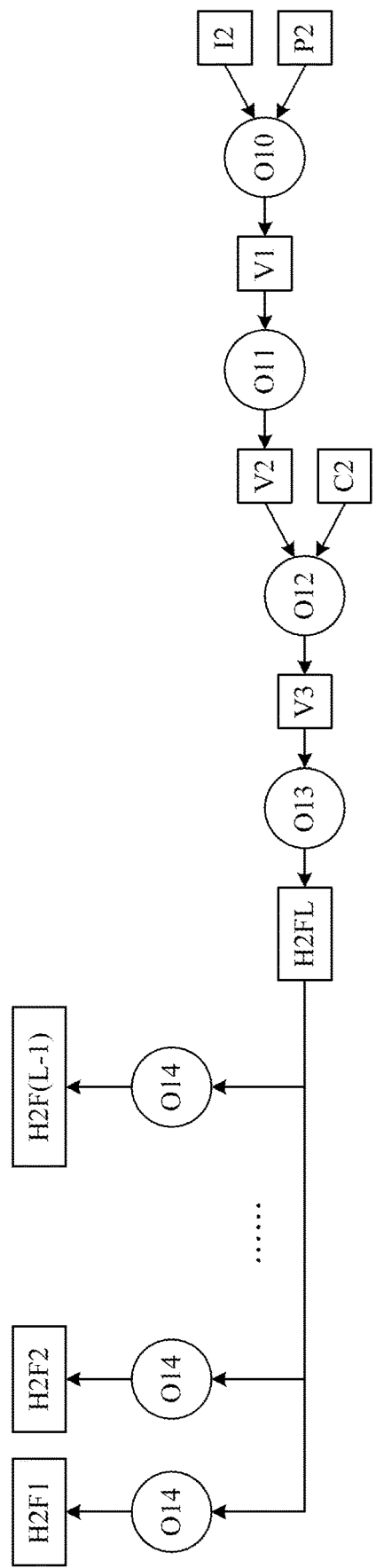
FIG. 6A illustrates a specific example of generating the ROI feature maps for the $x_1^{th}$ layer to the $x_2^{th}$ layer.
Figure 6B:
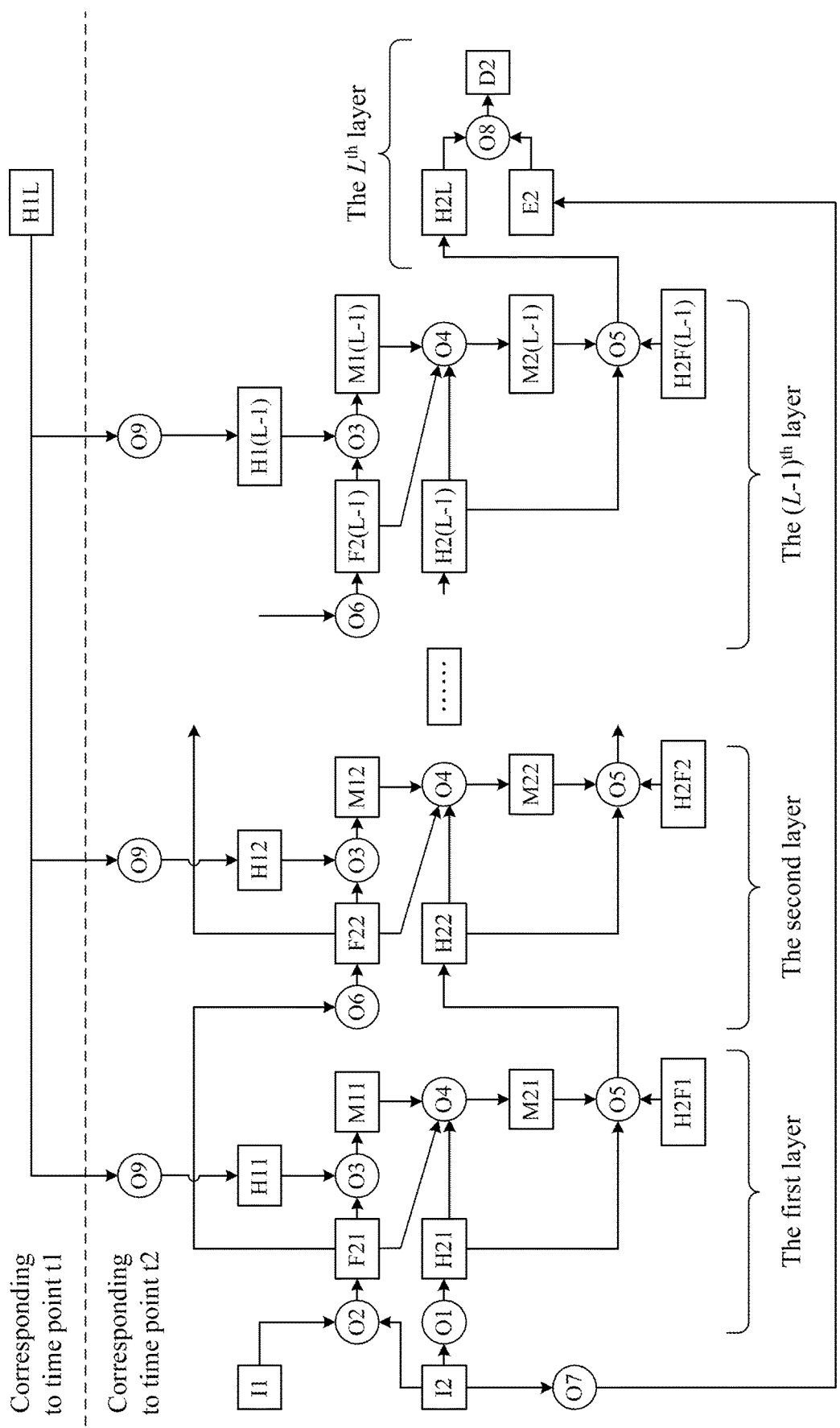
FIG. 6B illustrates another specific example that improves the feature maps for L–1 layers and then generates the display image frame by executing the operations corresponding to the $L^{th}$ layer.

Please refer to a specific example shown in FIG. 6A and FIG. 6B. In this particular example, $x_1=1$ and $x_2=L-1$ (i.e., improving the feature maps for L-1 layers in total and generating the display image frame by executing the operation corresponding to the $L^{th}$ layer). In this specific example, the image frame I2 is the current image frame, while the image frame I1 is the previous image frame.

As shown in FIG. 6A, the processor 135 crops O10 the image frame I2 to a sub-image frame V1 according to the coordination information P2 of the ROI corresponding to the time point t2 and then up-samples O11 the sub-image frame V1 to the ROI image frame V2. Next, the processor 135 generates an ROI feature map H2FL for the $L^{th}$ layer according to the ROI image frame V2 and the ROI image frame C2 received from the host 11. For example, the processor 135 may generate a superimposition image frame V3 by superimposing O12 the ROI image frame V2 and the ROI image frame C2 and then generate the ROI feature map H2FL for the $L^{th}$ layer by performing feature extraction O13 on the superimposition image frame V3. Next, the processor 135 generates the ROI feature maps H2F1, H2F2, . . . , H2F(L-1) for the first layer to the $(L-1)^{th}$ layer respectively by down-sampling O14 the ROI feature map H2FL at the $L^{th}$ layer for at least one time.

Please refer to FIG. 6B. When the processor 135 performs the operation (d) for the $l^{th}$ layer, the processor 135 generates the feature map of the current image frame for the $(l+1)^{th}$ layer according to the feature map of the current image frame at the $1^{th}$ layer, the advanced rectified feature map at the $1^{th}$ layer, and the ROI feature map at the $1^{th}$ layer. Taking the first layer as an example, the operation (d) generated the feature map H22 of the image frame I2 for the second layer according to the feature map H21, the advanced rectified feature map M21, and the ROI feature map H2F1. The second layer to the $(L-1)^{th}$ layer will be processed similarly, and the details are not repeated. By bringing the ROI feature map into the operation (d), the portable video display apparatus 13 may further partially enhance the feature maps of the current image frame layer by layer. As a result, the ROI of the generated display image D2 at the last stage will have better quality.

Figure 7:
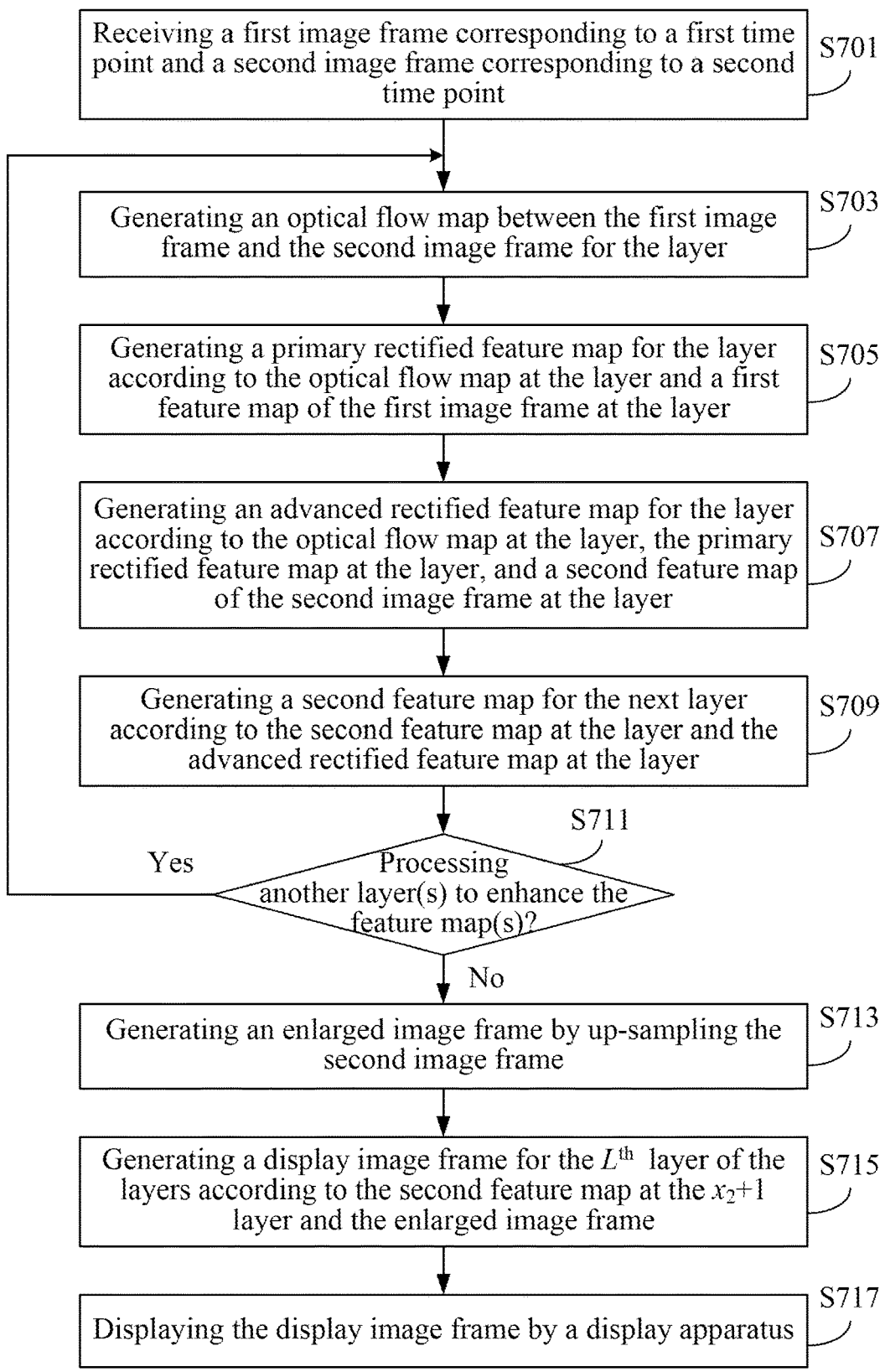
FIG. 7 illustrates the main flowchart of a video enhancement method in some embodiments of the present invention.

FIG. 7 illustrates the main flowchart of a video enhancement method in some embodiments of the present invention. The video enhancement method is for use in an electronic apparatus, e.g., the portable video display apparatus 13 in the embodiments described above. The video enhancement method at least comprises steps S701 to S717.

In step S701, the electronic apparatus receives a first image frame corresponding to a first time point and a second image frame corresponding to a second time point, wherein the second time point is later than the first time point. The second image frame is the image frame whose resolution and quality have to be enhanced.

By the electronic apparatus, the video enhancement method executes an image processing architecture with L layers, wherein L is a positive integer greater than one, and different layers correspond to different image resolutions. The video enhancement method executes the following steps S703, S705, S707, and S709 for each layer of $x_1^{th}$ layer to $x_2^{th}$ layer in sequence, wherein $x_1 \geq 1$, $x_2 \leq L-1$, and $x_1 \leq x_2$.

In step S703, the electronic apparatus generates an optical flow map between the first image frame and the second image frame for the layer. In step S705, the electronic apparatus generates a primary rectified feature map for the layer according to the optical flow map at the layer and a first feature map of the first image frame at the layer.

In step S707, the electronic apparatus generates an advanced rectified feature map for the layer according to the optical flow map at the layer, the primary rectified feature map at the layer, and a second feature map of the second image frame at the layer. In some embodiments, step S707 may comprise a step for generating an offset for use in a deformable convolution according to the primary rectified feature map at the layer, the optical flow map at the layer, and the second feature map at the layer, another step for generating a mask for use in the deformable convolution according to the primary rectified feature map at the layer and the second feature map at the layer, and another step for generating the advanced rectified feature map for the layer by performing the deformable convolution on one of the first feature map at the layer and the primary rectified feature map at the layer according to the offset and the mask.

In step S709, the electronic apparatus generates a second feature map for the next layer according to the second feature map at the layer and the advanced rectified feature map at the layer. In some embodiments, step S709 comprises a step for generating an aggregation feature map by aggregating the second feature map at the layer and the advanced rectified feature map at the layer and another step for generating the second feature map for the next layer by up-sampling the aggregation feature map.

Afterwards, step S711 is executed, in which the electronic apparatus determines whether another layer(s) has/have to be processed to enhance the feature map of the second image frame (i.e., determining whether the processing has reached the $x_2^{th}$ layer). If at least one layer has to be processed (i.e., the $x_2^{th}$ layer has not been reached), the electronic apparatus executes the steps S703, S705, S707, and S709 again for the next layer. If no other layer has to be processed (i.e., the $x_2^{th}$ layer has been reached), the electronic apparatus proceeds to step S713.

In step S713, the electronic apparatus generates an enlarged image frame by up-sampling the second image frame. Afterwards, in step S715, the electronic apparatus executes the $L^{th}$ layer of the layers to generate a display image frame for the $L^{th}$ layer according to the second feature map at the $(x_2+1)^{th}$ layer and the enlarged image frame. According to the present invention, step S713 may be executed at another time point as long as it is executed before step S715. Next, in step S717, the electronic apparatus displays the display image frame by a display apparatus.

In some embodiments, the electronic apparatus has sufficient hardware abilities, and thus $x_1$ and $x_2$ may be set to 1 and L−1 (i.e., $x_1=1$ and $x_2=L-1$) respectively to improve the feature maps for L−1 layers in total. In those embodiments, step S715 generates the display image frame by projecting the second feature map at the $L^{th}$ layer onto the enlarged image frame.

In some embodiments, the electronic apparatus has limited hardware abilities, and thus both $x_1$ and $x_2$ may be set to 1 (i.e., $x_1=1$ and $x_2=x_1$) to improve the feature map at the first layer only. In those embodiments, step S715 comprises a step for generating a second feature map for the $L^{th}$ layer by up-sampling the second feature map at the $(x_2+1)^{th}$ layer and another step for generating the display image frame by projecting the second feature map at the $L^{th}$ layer onto the enlarged image frame.

In some embodiments, to improve the feature maps of the current image frame layer by layer more accurately, the video enhancement method may further comprise a step in which the electronic apparatus generates the first feature map for each layer of the $x_1^{th}$ layer to the $x_2^{th}$ layer by down-sampling the first feature map of the first image frame at the $L^{th}$ layer for at least one time. The first feature maps at the $x_1^{th}$ layer to the $x_2^{th}$ layer are used in steps S705 and S707.

Figure 8:
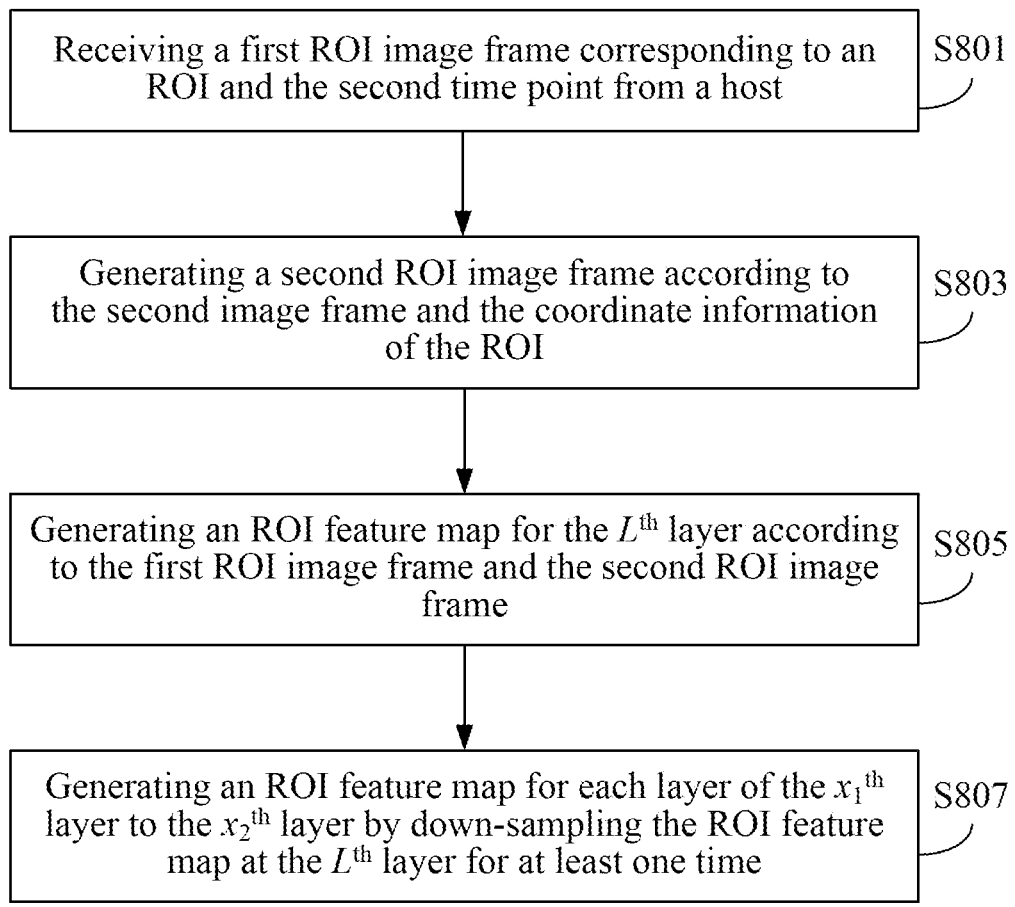
FIG. 8 illustrates the partial flowchart of a video enhancement method in some embodiments of the present invention.

In some embodiments, to improve the feature maps of the current image frame layer by layer more accurately, the video enhancement method may adopt the FVSR technique. The video enhancement method will partially improve each feature map of the current image frame in a layer-by-layer fashion according to coordinate information of at least one ROI, and the main flowchart is illustrated in FIG. 8.

In step S801, the electronic apparatus receives a first ROI image frame corresponding to an ROI and the second time point from a host. In some embodiments, the ROI and its coordinate information are predetermined, and both the host and the electronic apparatus know the coordinate information of the ROI. In some other embodiments, the video enhancement method executes a step for tracking a plurality of gaze points of a user on the display apparatus by an eye-tracking apparatus, another step for determining the coordinate information of the ROI on the display apparatus according to the gaze points, and another step for transmitting the coordinate information to the host, and then executes step S801.

In step S803, the electronic apparatus generates a second ROI image frame according to the second image frame and the coordinate information of the ROI. In some embodiments, step S803 comprises a step for cropping the second image frame to a sub-image frame according to the coordinate information of the ROI and another step for generating the second ROI image frame by up-sampling the sub-image frame.

In step S805, the electronic apparatus generates an ROI feature map for the $L^{th}$ layer according to the first ROI image frame and the second ROI image frame. In step S807, the electronic apparatus generates an ROI feature map for each layer of the $x_1^{th}$ layer to the $x_2^{th}$ layer by down-sampling the ROI feature map at the $L^{th}$ layer for at least one time.

When executing step S709, the video enhancement method that adopts the FVSR technique also utilizes the corresponding ROI feature map generated in step S807 to improve the feature map of the second image frame at each layer in part. Specifically, in those embodiments, step S709 generates the second feature map for the next layer according to the second feature map at the layer, the advanced rectified feature map at the layer, and the ROI feature map at the layer.

In addition to the previously mentioned steps, the video enhancement method provided by the present invention can also execute all the operations and steps that can be executed by the portable video display apparatus 13, have the same functions, and deliver the same technical effects as the portable video display apparatus 13. How the video enhancement method provided by the present invention executes these operations and steps, has the same functions, and delivers the same technical effects as the portable video display apparatus 13 will be readily appreciated by a person having ordinary skill in the art based on the above explanation of the portable video display apparatus 13, and thus will not be further described herein.

It shall be appreciated that, in the specification and the claims of the present invention, some terms (e.g., feature map, image frame) are preceded by "first" or "second." Please note that "first" and "second" are used only for distinguishing different terms. If the order of these terms is not specified or cannot be derived from the context, the order of these terms is not limited by the preceded "first" and "second."

According to the above descriptions, the video display technology provided by the present invention (at least comprises the portable video display apparatus, the video display system, and the video enhancement method) adopts an image processing architecture having L layers. From the $x_1^{th}$ layer to the $x_2^{th}$ layer, the video display technology provided by the present invention improves the feature maps of the current image frame (i.e., the image frame corresponding to the current time point, such as the aforesaid second image frame) by the feature maps of the previous image frame (i.e., the image frame corresponding to the previous time point, such as the aforesaid first image frame) in a layer-by-layer fashion. In different embodiments, the video display technology provided by the present invention adopts different ways to generate the feature maps of the previous image frame used at the $x_1^{th}$ layer to the $x_2^{th}$ layer. Furthermore, in some embodiments of the present invention, for each layer of the $x_1^{th}$ layer to the $x_2^{th}$ layer, a clearer ROI feature map may be generated according to coordinate information of an ROI, and the ROI feature map is used to partially improve the feature map of the current image frame at the layer. The video display technology provided by the present invention generates an enlarged image frame by up-sampling the current image frame, generates a display image frame by projecting the improved feature map at the last layer (i.e., the $L^{th}$ layer) onto the enlarged image frame, and then display the display image frame. Since the feature map of the current image frame at the last layer has been improved in a layer-by-layer fashion, projecting it onto the enlarged image frame will result in a display image frame that is of high resolution and high quality.

The above disclosure is related to the detailed technical contents and inventive features. A person having ordinary skill in the art may proceed with various modifications and replacements based on the disclosures and suggestions of the invention as described without departing from the characteristics thereof. Nevertheless, although such modifications and replacements are not fully disclosed in the above descriptions, they have been substantially covered in the following claims as appended.

What is claimed is:

1. A portable video display apparatus, comprising:
a display apparatus;
a transceiving interface, being configured to receive a first image frame corresponding to a first time point and a second image frame corresponding to a second time point, wherein the second time point is later than the first time point; and
a processor, being electrically connected to the display apparatus and the transceiving interface and configured to adopt an image processing architecture having L layers, wherein L is a positive integer greater than one, and different layers correspond to different image resolutions, wherein the processor is configured to perform the following operations for each layer of $x_1^{th}$ layer to $x_2^{th}$ layer in sequence, wherein $x_1 \geq 1$, $x_2 \leq L-1$, and $x_1 \leq x_2$:
generating an optical flow map between the first image frame and the second image frame for the layer,
generating a primary rectified feature map for the layer according to the optical flow map at the layer and a first feature map of the first image frame at the layer;
generating an advanced rectified feature map for the layer according to the optical flow map at the layer, the primary rectified feature map at the layer, and a second feature map of the second image frame at the layer, and
generating a second feature map for the next layer according to the second feature map at the layer and the advanced rectified feature map at the layer,
wherein the processor is further configured to generate an enlarged image frame by up-sampling the second image frame and generate a display image frame according to the second feature map at the $(x_2+1)^{th}$ layer and the enlarged image frame,
wherein the display apparatus is configured to display the display image frame.

2. The portable video display apparatus of claim 1, wherein $x_1=1$ and $x_2=x_1$, and the processor is further configured to generate a second feature map for an $L^{th}$ layer by up-sampling the second feature map at the $(x_2+1)^{th}$ layer,
wherein the processor is configured to generate the display image frame by projecting the second feature map at the $L^{th}$ layer onto the enlarged image frame.

3. The portable video display apparatus of claim 1, wherein $x_1=1$ and $x_2=L-1$, and the processor is configured to generate the display image frame by projecting the second feature map at an $L^{th}$ layer onto the enlarged image frame.

4. The portable video display apparatus of claim 1, wherein for each layer of $x_1^{th}$ layer to $x_2^{th}$ layer, the processor is configured to generate the advanced rectified feature map for the layer by performing the following operations:

generating an offset for use in a deformable convolution according to the primary rectified feature map at the layer, the optical flow map at the layer, and the second feature map at the layer, generating a mask for use in the deformable convolution according to the primary rectified feature map at the layer and the second feature map at the layer, and generating the advanced rectified feature map for the layer by performing the deformable convolution on one of the first feature map at the layer and the primary rectified feature map at the layer according to the offset and the mask.

5. The portable video display apparatus of claim 1, wherein for each layer of $x_1^{th}$ layer to $x_2^{th}$ layer, the processor is configured to generate the second feature map for the next layer by performing the following operations:

generating an aggregation feature map by aggregating the second feature map at the layer and the advanced rectified feature map at the layer, and generating the second feature map for the next layer by up-sampling the aggregation feature map.

6. The portable video display apparatus of claim 1, wherein the processor is further configured to generate the first feature map for each layer of $x_1^{th}$ layer to $x_2^{th}$ layer by down-sampling the first feature map of the first image frame at the $L^{th}$ layer.

7. The portable video display apparatus of claim 6, wherein the transceiving interface is further configured to receive a first Region-Of-Interest (ROI) image frame corresponding to an ROI and the second time point from a host, the processor is further configured to generate a second ROI image frame according to the second image frame and a coordinate information of the ROI, the processor is further configured to generate an ROI feature map for the $L^{th}$ layer according to the first ROI image frame and the second ROI image frame, wherein the processor is further configured to generate an ROI feature map for each layer of $x_1^{th}$ layer to $x_2^{th}$ layer by down-sampling the ROI feature map at the $L^{th}$ layer for at least one time, and wherein for each layer of $x_1^{th}$ layer to $x_2^{th}$ layer, the processor is configured to generate the second feature map for the next layer according to the second feature map at the layer, the advanced rectified feature map at the layer, and the ROI feature map at the layer.

8. The portable video display apparatus of claim 7, wherein the processor is configured to generate the second ROI image frame by cropping the second image frame to a sub-image frame according to the coordinate information of the ROI and generate the second ROI image frame by up-sampling the sub-image frame.

9. The portable video display apparatus of claim 7, further comprising:

an eye-tracking apparatus, being configured to track a plurality of gaze points of a user on the display apparatus, wherein the processor is further configured to determine the coordinate information of the ROI on the display apparatus according to the gaze points, and the transceiving interface is further configured to transmit the coordinate information to the host.

10. The portable video display apparatus of claim 1, wherein the transceiving interface is configured to receive a video stream from a host, and the processor derives the first image frame and the second image frame by decompressing the video stream.

11. A video display system, comprising:

a host, being configured to generate a first image frame by down-sampling a first original image frame corresponding to a first time point, generate a second image frame by down-sampling a second original image frame corresponding to a second time point, and transmit the first image frame and the second image frame; and the portable video display apparatus of claim 1.

12. A video enhancement method for use in an electronic apparatus, comprising the following steps:

receiving a first image frame corresponding to a first time point and a second image frame corresponding to a second time point, wherein the second time point is later than the first time point;

generating an enlarged image frame by up-sampling the second image frame;

executing an image processing architecture having L layers, wherein L is a positive integer greater than one, and different layers correspond to different image resolutions, wherein:

performing the following steps for each layer of $x_1^{th}$ layer to $x_2^{th}$ layer in sequence, wherein $x_1 \geq 1$, $x_2 \leq L-1$, and $x_1 \leq x_2$:

generating an optical flow map between the first image frame and the second image frame for the layer;

generating a primary rectified feature map for the layer according to the optical flow map at the layer and a first feature map of the first image frame at the layer;

generating an advanced rectified feature map for the layer according to the optical flow map at the layer, the primary rectified feature map at the layer, and a second feature map of the second image frame at the layer; and generating a second feature map for the next layer according to the second feature map at the layer and the advanced rectified feature map at the layer; and generating a display image frame for an $L^{th}$ layer of the layers according to the second feature map at the $(x_2+1)^{th}$ layer and the enlarged image frame; and displaying the display image frame by a display apparatus.

13. The video enhancement method of claim 12, wherein $x_1=1$ and $x_2=x_1$, and the step of generating the display image comprises the following steps:

generating second feature map for the $L^{th}$ layer by up-sampling the second feature map at the $(x_2+1)^{th}$ layer; and generating the display image frame by projecting the second feature map at the $L^{th}$ layer onto the enlarged image frame.

14. The video enhancement method of claim 12, wherein $x_1=1$ and $x_2=L-1$, and the step of generating the display image comprises the following step:

generating the display image frame by projecting the second feature map at the $L^{th}$ layer onto the enlarged image frame.

15. The video enhancement method of claim 12, wherein for each layer of $x_1^{th}$ layer to $x_2^{th}$ layer, the step of generating the advanced rectified feature map comprises the following steps:

generating an offset for use in a deformable convolution according to the primary rectified feature map at the layer, the optical flow map at the layer, and the second feature map at the layer;

generating a mask for use in the deformable convolution according to the primary rectified feature map at the layer and the second feature map at the layer; and generating the advanced rectified feature map for the layer by performing the deformable convolution on one of the first feature map at the layer and the primary rectified feature map at the layer according to the offset and the mask.

16. The video enhancement method of claim 12, wherein for each layer of $x_1^{th}$ layer to $x_2^{th}$ layer, the step of generating the second feature map for the next layer comprises the following steps:
generating an aggregation feature map by aggregating the second feature map at the layer and the advanced rectified feature map at the layer; and
generating the second feature map for the next layer by up-sampling the aggregation feature map.

17. The video enhancement method of claim 12, further comprising the following step:
generating the first feature map for each layer of $x_1^{th}$ layer to $x_2^{th}$ layer by down-sampling the first feature map of the first image frame at the $L^{th}$ layer for at least one time.

18. The video enhancement method of claim 17, further comprising the following steps:
receiving a first ROI image frame corresponding to an ROI and the second time point from a host;
generating a second ROI image frame according to the second image frame and a coordinate information of the ROI;
generating an ROI feature map for the $L^{th}$ layer according to the first ROI image frame and the second ROI image frame;
generating an ROI feature map for each layer of $x_1^{th}$ layer to $x_2^{th}$ layer by down-sampling the ROI feature map at the $L^{th}$ layer for at least one time;
wherein for each layer of $x_1^{th}$ layer to $x_2^{th}$ layer, the second feature map at the next layer is generated according to the second feature map at the layer, the advanced rectified feature map at the layer, and the ROI feature map at the layer.

19. The video enhancement method of claim 18, wherein the step of generating the second ROI image frame comprises the following steps:
cropping the second image frame to a sub-image frame according to the coordinate information of the ROI; and
generating the second ROI image frame by up-sampling the sub-image frame.

20. The video enhancement method of claim 18, further comprising the following steps:
tracking a plurality of gaze points of a user on the display apparatus by an eye-tracking apparatus;
determining the coordinate information of the ROI on the display apparatus according to the gaze points; and
transmitting the coordinate information to the host.

* * * * *